March 4, 1924.

A. L. FORSTER 1,485,500

MACHINERY FOR PRODUCING GLASS SHEETS OR PLATES

Filed Dec. 11, 1922

Inventor:
A. L. Forster

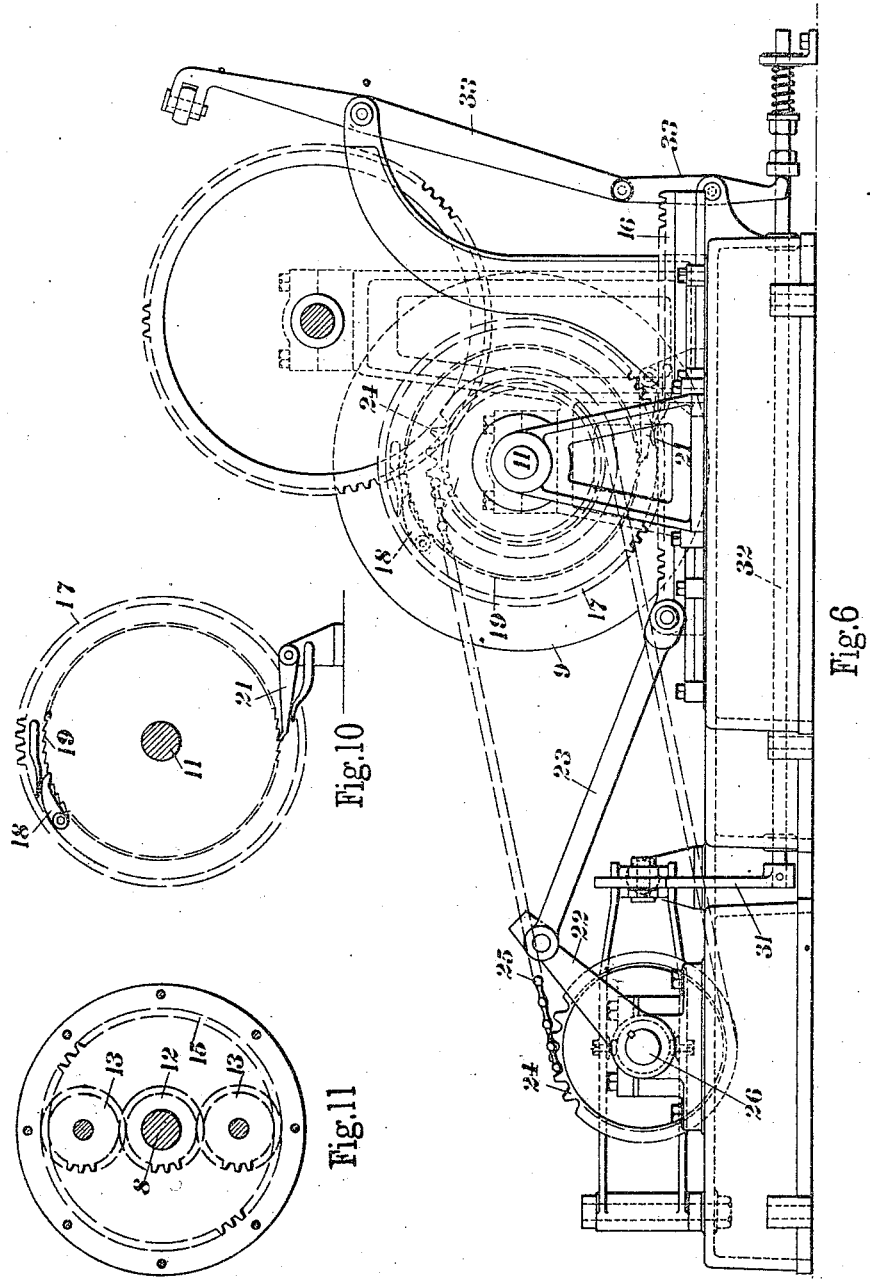

March 4, 1924.

A. L. FORSTER 1,485,500

MACHINERY FOR PRODUCING GLASS SHEETS OR PLATES

Filed Dec. 11, 1922    5 Sheets-Sheet 4

Inventor:
A. L. Forster

Patented Mar. 4, 1924.

1,485,500

UNITED STATES PATENT OFFICE.

ALFRED LINDSAY FORSTER, OF SMETHWICK, ENGLAND, ASSIGNOR OF ONE-HALF TO CHANCE BROTHERS AND CO., LIMITED, OF SMETHWICK, ENGLAND.

MACHINERY FOR PRODUCING GLASS SHEETS OR PLATES.

Application filed December 11, 1922. Serial No. 606,255.

*To all whom it may concern:*

Be it known that I, ALFRED LINDSAY FORSTER, a British subject, residing at Glass Works, Smethwick, in the county of Stafford, England, have invented certain new and useful Improvements Relating to Machinery for Producing Glass Sheets or Plates, of which the following is a specification.

This invention has for its object to provide improved machinery whereby a number of separate glass sheets or plates can be produced in succession from a quantity of molten glass.

The invention comprises the combination with a rolling or other sheet forming machine, of a device for cutting the glass into sheets or plates, the said device whilst in action being caused to move with the glass.

The invention also comprises the employment for cutting the glass transversely, of rotary cutting tools, and a holder for the tools to which a movement is imparted in the same direction as the glass during the cutting operation.

Further, the invention comprises the imparting to the carrier or table which receives the severed sheets or plates, of intermittent accelerated movements whereby the sheets or plates are separated after the cutting operations.

In the five accompanying sheets of explanatory drawings:—

Figure 6 is a side elevation, Figure 7 an end elevation, and Figure 8 a plan of the table operating mechanism.

Figure 10 is a side elevation of a ratchet and pawl device, and Figure 11 a side elevation of an epicyclic gear forming part of the operating mechanism.

The rolling machine comprises a pair of rolls $a$, $b$ on to the upper side of which can be discharged from a pot or ladle a quantity of molten glass as $c$. The sheet produced by the action of the rolls passes down a pair of guide plates $d$ between which is arranged a guide roller $e$. From the lower plate $d$ the glass passes on to a horizontally movable table $f$ which may be carried by rollers on rails $g$ and is actuated by a pinion $h$ engaging a rack $i$ secured to the underside of the table.

Severing of the sheet produced by the rolls into plates of the required length is effected by circular rotatable cutting tools $j$. Four of such tools are employed in the machine illustrated. A pair of tools are carried on the ends of each of a pair of bars $k$ pivoted to the ends of a lever $l$ which is controlled by a spring $m$. The parts $k$ and $l$ are carried on a cross bar $n$ constructed from a pair of side members as shown, the tools $j$, bars $k$ and lever $l$ being mounted between the members of the bar $n$. At positions near each end the bar $n$ is formed at its upper side with projecting portions $o$ having inclined ends $p$, and adjacent to such portions the underside of an intermediate piece $q$ is shaped to form a recess with inclined ends $r$. The bar is carried by oscillatory frames $s$ on the end frames $t$ of the machine, rollers $u$ being arranged on the frames $s$ to coact with the upper edges of the bar and a roller $v$ to coact with the underside of the bar for the purpose hereinafter described. Endwise movement is given to the bar by the action of any suitable means such as compressed air or other fluid pressure on a piston in a cylinder $w$ carried on one of the frames $s$, motion being imparted to the bar through a rod $x$ and link $y$. Actuation of a valve controlling the admission of fluid to the cylinder is effected automatically at proper intervals in any convenient manner.

Figure 5:
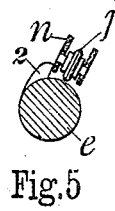
Figure 5 is a section of the same member on the line 5—5 (Figure 1) the adjacent portion of one of the rolls being also shown in this view.
Figure 3:
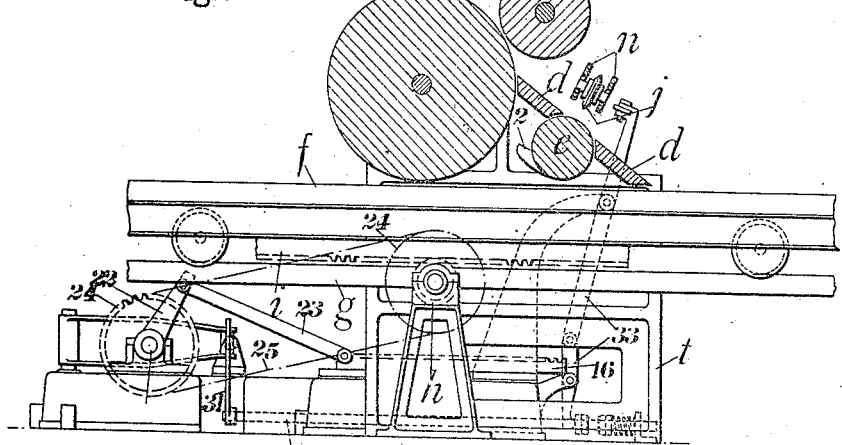
Figure 7:
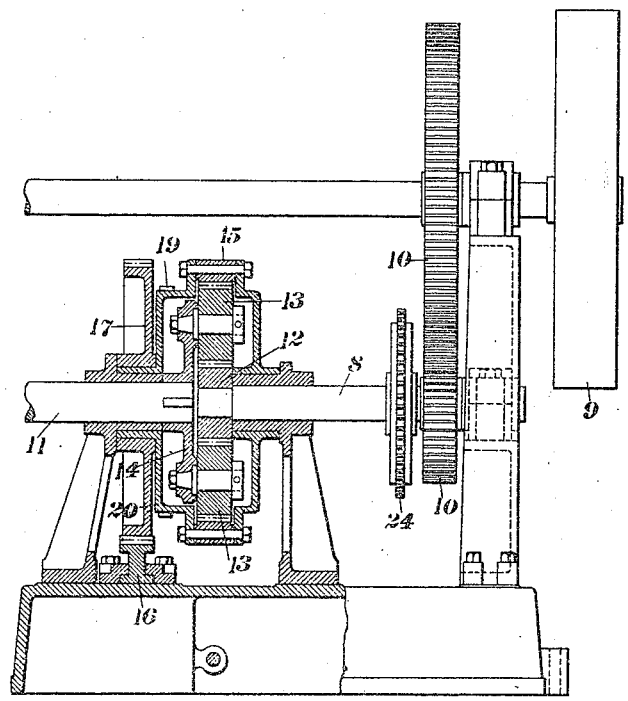
Figure 9:
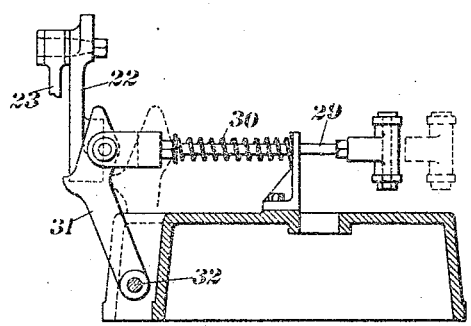
Figure 9 is an end elevation of a portion of a clutch controlling device.
Figure 8:
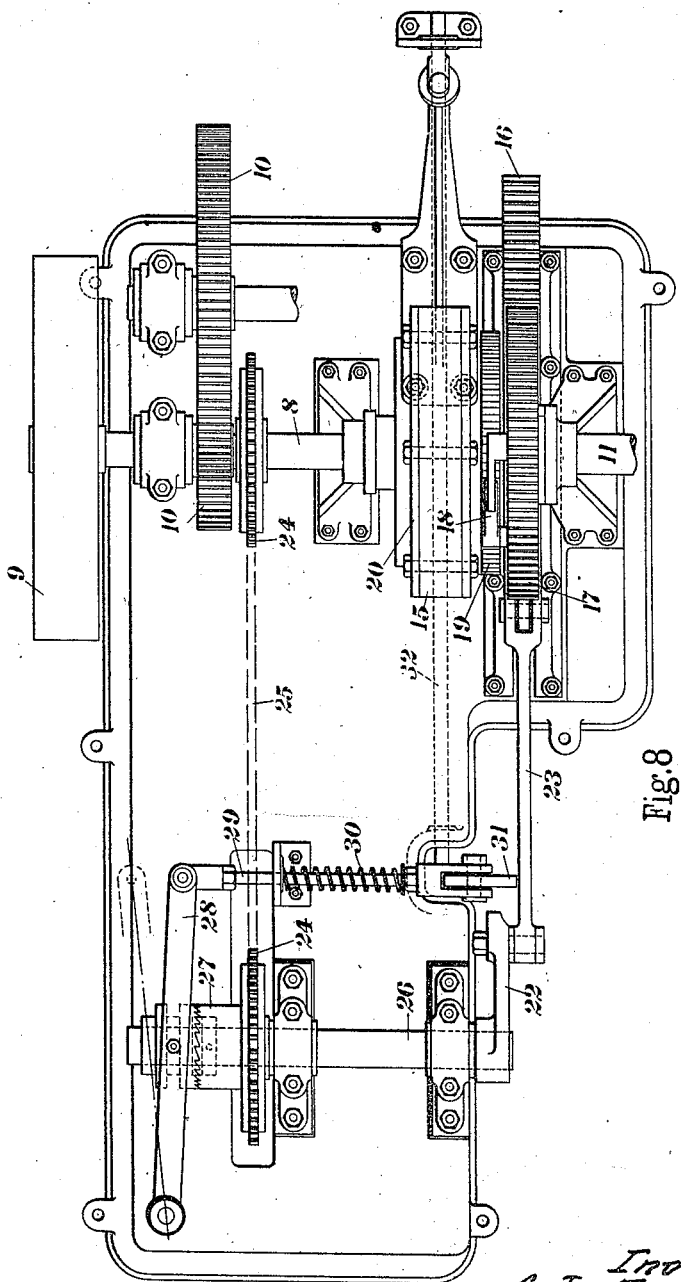

The cutting tools are arranged to operate in conjunction with the guide roller $e$. The frames $s$ oscillate about the axis of said roller. In the position shown the tools are clear of the roller. During the cutting operation two motions of the bar $n$ are required, the one in a downward direction relatively to the frames $s$ to bring the tools into contact with the glass, and the other with the frames $s$ in the direction of motion of the glass to prevent puckering or buckling of the glass which is in a soft condition. The downward movement of the bar is effected during the endwise movement by the interaction of the rollers $u$, $v$ and the inclined portions $p$, $r$. The angular movement of the frames $s$ in the forward direction is effected by the pressure of abutment pieces 2 on the roller $e$ against the rear side of the bar $n$ as shown in Figure 5. To prevent the tools from coming into contact with the glass until the abutment pieces 2 are in contact with the bar, a pair of stops 3 are provided on the rear of the bar and these are arranged to coact with lugs 4 on the end frames of the machine.

Figures 1, 4:
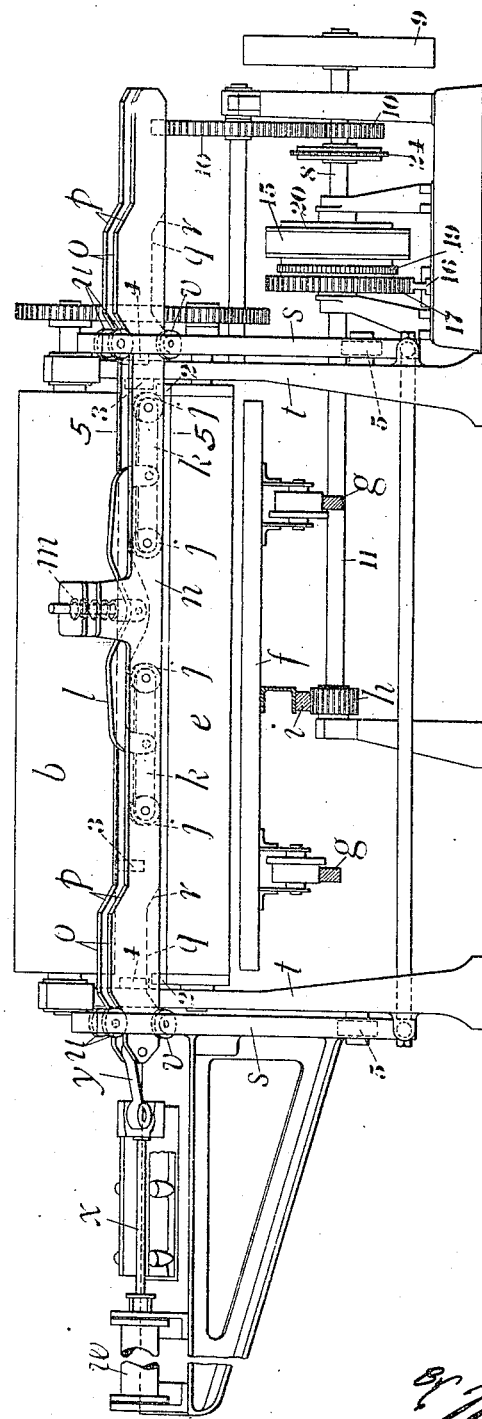
Figure 1 is a front elevation, Figure 2 a side elevation, and Figure 3 a longitudinal section showing the application of my invention to a glass rolling machine.
Figure 4 is a plan illustrating an arrangement of stops on the bar carrying the cutting tools.
Figure 2:
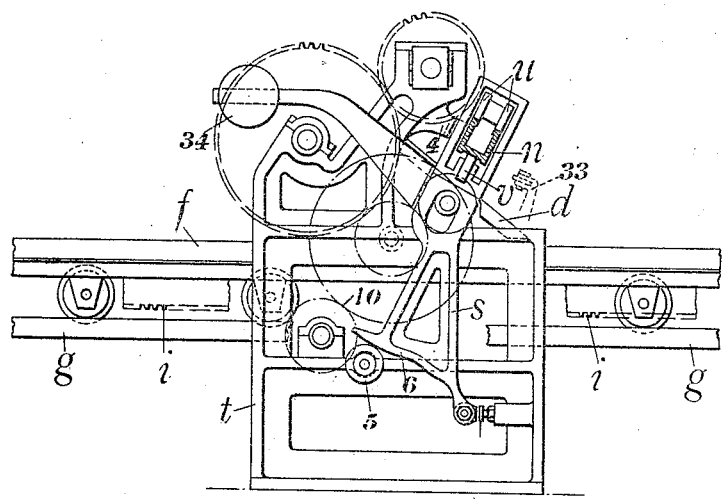

Referring to Figure 4, the first movement of the bar to perform one cutting operation will be from right to left. During the initial part of this movement the right hand stop 3 will come into contact with the adjacent lug 4, and the bar will be held until the abutment pieces 2 come into action on the bar. As soon as these reach the bar they carry it forward until the said stop 3 is moved clear of the lug 4. The bar can then continue its endwise movement and also drop to the extent required to bring the tools into action. While the tools are producing a transverse incision in the glass and thereby separating the forward portion from that emerging from the rolls, the tools are also moving with the glass. At the end of the cutting operation the left hand stop 3 is on the side of the left hand lug 4 opposite to that shown in Figure 4. Also the bar has been raised clear of the glass by the interaction of the rollers $u$, $v$ and parts $p$, $r$. The abutment pieces 2 then leave the bar $n$ and permit the frames $s$ carrying the bar to be returned to the initial position by gravity or under the action of a weight 34. In the event of the bar $n$ not completing its endwise motion and rising clear of the abutments 2, disconnection of the bar from the abutments is effected by the provision on each end frame of the machine of a roller 5 which co-operates with a cam 6 at the lower end of the moving frame $s$, the cam and roller serving to lift the frame $s$, and so carry the bar clear of the abutments. The next cutting operation on the succeeding glass sheet is effected by a movement of the bar $n$ from left to right, when the above described operations are repeated.

Immediately after each cutting operation it is advantageous to separate the severed sheet or plate by a suitable amount from the succeeding portion of the sheet emerging from the rolls. This is effected in accordance with this invention by imparting an accelerated motion to the table $f$ at the end of each cutting operation. The roll and table driving mechanism is illustrated in detail by Figures 6–11. Motion is imparted to a shaft 8 by a belt on a pulley 9, or in any other convenient manner. The shaft 8 rotates at a uniform rate and motion is taken from it to the rolls through gear wheels 10. Coaxially with the shaft 8 is arranged another shaft 11 carrying the above mentioned table driving pinion $h$. On one end of the shaft 8 is secured a sun pinion 12 engaging planet pinions 13 mounted on a carrier 14 secured to the adjacent end of the shaft 11. The pinions 13 also engage with an independently rotatable internally toothed annulus 15 which can be rotated in one direction by a reciprocating rack 16, freely rotatable wheel 17, pawl 18 on the wheel 17, and ratchet 19 on the case 20 of the annulus 15. Reverse rotation of the annulus is prevented by a pawl 21. Reciprocation of the rack is effected by a crank 22 and rod 23, the crank receiving its motion intermittently from the shaft 8 through sprockets 24 and chain 25. On the shaft 26 of the crank 22 is arranged a clutch 27 which is actuated by a lever 28 and rod 29, spring 30, lever 31, rod 32, and levers 33. In the position shown the clutch is in action and motion can be imparted to the rack from the sprocket mechanism. Towards the end of one rotation the crank strikes the inclined edge of the lever 31 and by pushing that lever aside moves the rod 29 and lever 28 against the action of the spring 30 in the direction for disconnecting the clutch. When the clutch is free a normal motion is transmitted through the epicyclic mechanisms to the table. At the end of a cutting operation the bar $n$ strikes the upper end of one of the levers 33 and through the rod 32 causes said lever to withdraw the lever 31 from the restraining action of the crank 22 and allows the clutch to be reconnected by the action of the spring 30. During the first half rotation of the crank the rack 16 imparts motion to the annulus 15 and causes an accelerated movement to be given to the table for effecting the required separation of the severed sheet or plate. During the second half revolution the crank returns the rack to its initial position and is arrested by the lever 31 as above described for disconnecting the clutch.

The invention is not limited to the particular means herein described for cutting the glass or for imparting additional intermittent movements to the table. For example instead of rotary cutting tools a pair of shear blades may be used, one of the blades being arranged in conjunction with the guide roll above described and the other carried by a frame which can move with the said roll.

Having thus described my invention what I claim as new and desire to secure by Letters Patent is:

1. In glass plate forming machines, the combination comprising cutting tools for severing the formed glass into plates, a tool carrying bar movable in an endwise direction, angularly movable supports for the bar, a roller with which the cutters co-operate in the cutting of the glass and means for moving the bar and its supports about the axis of the roller, substantially as described.

2. In glass plate forming machines, the combination comprising rotary cutting tools for severing the formed glass into plates, a bar carrying the tools angularly movable supports for the bar permitting a rising and falling as well as an endwise movement of the bar, means for imparting endwise movement to the bar, and rotary abutment pieces for imparting angular movements to the bar supports, substantially as described.

3. In glass plate forming machines, the combination comprising a guide roll, rotary cutting tools situated over the guide roll, a bar carrying the cutting tools, angularly movable supports carrying the bar, the said supports being adapted to permit endwise movement of the bar, coacting means on the bar and its supports whereby an endwise movement of the bar is accompanied by falling and rising movements of the bar, means on one of the bar supports for producing endwise movements of the bar, abutments on the guide roll for imparting angular movement in one direction to the bar and its supports, and interacting stationary lugs on the machine and stops on the bar for preventing operation of the cutting tools on the glass until after the commencement of the forward angular movement of the bar supports, substantially as described.

4. In glass plate forming machines, the combination comprising a guide roll, rotary cutting tools situated over the guide roll, a bar carrying the cutting tools, angularly movable supports carrying the bar, the said supports being adapted to permit endwise movement of the bar, coacting means on the bar and its supports whereby an endwise movement of the bar is accompanied by falling and rising movements of the bar, means on one of the bar supports for producing endwise movements of the bar, abutments on the guide roll for imparting angular movement in one direction to the bar and its supports, interacting stationary lugs on the machine and stops on the bar for preventing operation of the cutting tools on the glass until after the commencement of the forward angular movement of the bar supports, and means acting on the bar supports for raising the same and disengaging the tool bar from the abutments on the guide roll in the event of failure of the means whereby the tools are normally raised clear of the rolled glass, substantially as described.

5. In a glass plate forming machine provided with a horizontally movable table on which the glass plates are deposited, the combination comprising cutters movable relatively to and with the formed glass for severing it into plates, means for producing a uniform movement of the table, and means for producing intermittent accelerated movements of the table after each cutting operation for separating the severed portions of the glass, substantially as described.

6. In a glass plate forming machine provided with a horizontally movable table on which the glass plates are deposited, the combination comprising cutters movable relatively to and with the formed glass for severing it into plates, means consisting in part of epicyclic mechanism for imparting uniform movement to the table, and means acting on the epicyclic mechanism for producing intermittent accelerated movements of the table after each cutting operation for separating the severed portions of the glass, substantially as described.

7. In a glass plate forming machine provided with a horizontally movable table on which the glass plates are deposited, the combination comprising cutters for severing the formed glass into plates, a cutter carrying member movable relatively to and with the formed glass, epicyclic driving mechanism for imparting uniform movement to the table, a reciprocatory rack, wheel and ratchet and pawl mechanism acting in conjunction with an element of the epicyclic mechanism for producing intermittent accelerated movements of the table for separating the severed glass portions, a crank for reciprocating the rack, a clutch for controlling the motion of the crank, and means actuated by the crank and by the cutter carrying member for controlling the clutch, substantially as described.

In testimony whereof I have signed my name to this specification.

ALFRED LINDSAY FORSTER.